United States Patent
Stanger

(10) Patent No.: US 9,901,212 B2
(45) Date of Patent: Feb. 27, 2018

(54) MOIST AND CRISPY PRODUCT HOLDING CABINET WITH HEATED AIRFLOW

(71) Applicant: THE DELFIELD COMPANY LLC, Mt. Pleasant, MI (US)

(72) Inventor: Keith A. Stanger, Trinity, FL (US)

(73) Assignee: THE DELFIELD COMPANY, LLC, Mt. Pleasant, MI (US)

( * ) Notice: Subject to any disclaimer, the term of this patent is extended or adjusted under 35 U.S.C. 154(b) by 0 days.

(21) Appl. No.: 13/923,886

(22) Filed: Jun. 21, 2013

(65) Prior Publication Data
US 2014/0010937 A1  Jan. 9, 2014

Related U.S. Application Data

(60) Provisional application No. 61/664,688, filed on Jun. 26, 2012.

(51) Int. Cl.
*A47J 39/00* (2006.01)

(52) U.S. Cl.
CPC ........... *A47J 39/003* (2013.01); *A47J 39/006* (2013.01)

(58) Field of Classification Search
CPC .... A21B 1/00; A21B 1/02; A21B 1/04; A21B 1/06; A21B 1/08; A21B 1/24; A21B 1/245; A21B 1/26; A21B 1/28; A21B 1/40; A47J 39/003; A47J 39/006
USPC ................. 426/418; 219/428, 385, 400, 392
See application file for complete search history.

(56) References Cited

U.S. PATENT DOCUMENTS

| 3,385,952 A | 5/1968 | Mix |
| 4,446,780 A * | 5/1984 | Puvogel ............... A47J 39/003 99/480 |
| 6,060,701 A | 5/2000 | McKee et al. |
| 6,175,099 B1 | 1/2001 | Shei et al. |

(Continued)

FOREIGN PATENT DOCUMENTS

| CN | 1691890 | 11/2005 |
| CN | 101355899 | 1/2009 |

(Continued)

OTHER PUBLICATIONS

"Heatsink Product Holding Units for Burger King"; Duke Manufacturing Company; 2010; pp. 1-2.

(Continued)

*Primary Examiner* — Steven Leff
(74) *Attorney, Agent, or Firm* — Ohlandt, Greeley, Ruggiero & Perle, L.L.P.

(57) ABSTRACT

A food holding cabinet having at least one heating chamber for holding at least one food tray therein, the cabinet comprising: a housing that defines the heating chamber and a heating chamber opening for access to the heating chamber, wherein the heating chamber comprises an top portion, front portion, a rear portion, and at least one tray location for receiving a food tray; a jet plate including a plurality of apertures, the jet plate is disposed between the heating chamber and an upper plenum, wherein the upper plenum is formed between an upper surface of the jet plate and a lower surface of the top portion of the heating chamber; and a blower positioned to provide heated gas into the upper plenum, wherein the gas exits the upper plenum through the apertures into the heating chamber such that it is direct substantially toward the food tray.

33 Claims, 16 Drawing Sheets

(56) References Cited

U.S. PATENT DOCUMENTS

| | | | |
|---|---|---|---|
| 6,262,394 B1 | 7/2001 | Shei et al. | |
| 6,376,817 B1 | 4/2002 | McFadden et al. | |
| 6,541,739 B2 | 4/2003 | Shei et al. | |
| 7,227,102 B2 | 6/2007 | Shei | |
| 7,235,763 B2 * | 6/2007 | Christiaansen | H05B 6/6485 219/460.1 |
| 7,385,160 B2 | 6/2008 | Jones | |
| 7,446,282 B2 | 11/2008 | Shei et al. | |
| 7,834,299 B2 | 11/2010 | Claesson et al. | |
| 7,838,807 B2 * | 11/2010 | Claesson et al. | 219/681 |
| 2004/0020915 A1 | 2/2004 | Shei | |
| 2007/0108178 A1 | 5/2007 | Jones | |
| 2007/0144202 A1 | 6/2007 | Theodos et al. | |
| 2011/0253698 A1 | 10/2011 | Theodos et al. | |
| 2011/0253703 A1 | 10/2011 | Theodos et al. | |

FOREIGN PATENT DOCUMENTS

| | | |
|---|---|---|
| JP | 2005532144 | 10/2005 |
| JP | 2009511231 | 3/2009 |
| KR | 1020050051580 | 6/2005 |
| KR | 1020070116784 | 12/2007 |
| KR | 1020080057347 | 6/2008 |
| WO | 9641499 A1 | 12/1996 |

OTHER PUBLICATIONS

International Search Report dated Oct. 29, 2013 for PCT application No. PCT/US2013/047044.
Written Opinion dated Oct. 29, 2013 for PCT application No. PCT/US2013/047044.
International Preliminary Report on Patentability dated Jun. 9, 2014 corresponding to PCT/US13/47044, 11 pp.
Extended European Search Report and Opinion dated Feb. 19, 2016 from corresponding EP Application No. 13810825.3, 8 pages.
Japanese Office Action dated Jan. 19, 2016 for corresponding JP 2015-520331 with English translation, 8 pages.
English translation of Chinese Office Action dated Dec. 14, 2015 for corresponding CN 201380044217.6, 12 pages.
Office Action dated Oct. 10, 2016 for corresponding Korean patent application No. KR10-2015-7002004 with English translation, pp. 15.
Patent Examination Report dated Mar. 9, 2017 from corresponding Australian Patent Application No. 2013280743, pp. 5.
European Communication pursuant to Article 94(3) EPC dated Feb. 22, 2017 from corresponding EP Application No. 13810825.3, 5 pages.

* cited by examiner

MOIST AND CRISPY PRODUCT HOLDING CABINET WITH HEATED AIRFLOW

CROSS-REFERENCED APPLICATION

This application claims priority to U.S. Provisional Application No. 61/664,688, filed on Jun. 26, 2012, which is incorporated herein in its entirety by reference thereto.

BACKGROUND

1. Field

The present disclosure relates to food holding cabinets for holding cooked or partially-cooked food in one or more food trays at an elevated temperature until the food is to be served. More particularly, the present disclosure relates to a holding cabinet which utilizes a unique and novel airflow system with or without a food tray cover to enhance moisture retention or enhance crispiness of the food being held in the holding tray, respectively.

2. Discussion of the Background Art

Food holding cabinets, food trays and tray covers are well known, particularly in the fast food industry. The holding cabinets have heated chambers that hold multiple trays containing various food items at ready-to-serve temperatures for serving on an as needed basis. A widely used system employs a freestanding cover that is placed in the heating chamber of the cabinet and defines a receiving area for receiving a food tray. The food tray is placed in the receiving area until the tray is to be withdrawn from the chamber. The cabinet includes a wire rack for engaging the cover to prevent it from being withdrawn from the chamber along with the food tray. Although the wire rack serves its purpose, it interferes with cleaning the chamber. Also, there is heat loss through the space between the tray top edge and the freestanding cover.

One food holding cabinet is described in U.S. Pat. No. 7,385,160, which is incorporated herein by reference in its entirety. This food holding cabinet has a housing defining a heating chamber for holding a covered food tray in a tray location via a pair of elongated rigid rods mounted to the housing for suspending a food tray cover thereon in a position above the tray location. A front rod extends across the opening to the heating chamber and supports the front end of the tray cover and a rear rod supports the rear of the cover. When a food tray is inserted into the tray location, it lifts and supports the cover. When the tray is removed, the front rod prevents removal of the cover along with the underlying tray. The front rod is spring-loaded to be pulled away from the housing to facilitate removal of the cover.

This other food holding cabinets are disclosed in US Patent Publication Nos. 2011/0253703, 2011/0253698 and 2007/0144202, all of which are incorporated herein by reference in their entireties.

The present disclosure also provides many additional advantages, which shall become apparent as described below.

SUMMARY

A holding cabinet which utilizes a unique and novel airflow system with or without a food tray cover to enhance moisture retention or enhance crispiness of the food being held in the holding tray, respectively.

A food holding cabinet having at least one heating chamber for holding at least one food tray therein, the cabinet comprising: a housing that defines the heating chamber and a heating chamber opening for access to the heating chamber, wherein the heating chamber comprises an top portion, front portion, a rear portion, and at least one tray location for receiving a food tray; a jet plate including a plurality of apertures, the jet plate is disposed between the heating chamber and an upper plenum, wherein the upper plenum is formed between an upper surface of the jet plate and a lower surface of the top portion of the heating chamber; and a blower positioned to provide heated gas into the upper plenum, wherein the gas exits the upper plenum through the apertures into the heating chamber such that it is direct substantially toward the food tray.

In a moisture mode, the food holding cabinet further comprises a food tray cover disposed above the food tray, thereby retaining moisture in the food tray. Preferably, the food tray cover is disposed between an upper portion of the food tray and the jet plate, whereby the heated gas passes through the jet plate and contacts an upper surface of the food tray cover. The food tray cover comprises a flat plate in contact with the food tray and a perpendicularly upwardly facing front edge portion. The perpendicularly upwardly facing front edge portion comprises a plurality of venting apertures, whereby the heated gas which contacts the food tray cover exits the heating chamber. The food tray further comprises a perpendicularly outward facing lip portion, wherein the upwardly facing front edge portion is disposed between the flat plate and the outwardly facing lip portion.

In a crispy mode, the food tray comprises sidewalls and vents disposed in the sidewalls, thereby allowing the heated gas to contact the food, directly or indirectly, disposed in the food tray and thereby removing at least a portion of moisture from a surface of the food so as to maintain a crispy exterior of the food.

The blower preferably comprises a micro blower and heating element, wherein the heating element is disposed between the microblower and the jet plate.

A method for holding food in a food tray disposed in a heating chamber of a holding cabinet, the method comprising: placing the food tray with the food into the heating chamber, wherein the heating chamber comprises an top portion, front portion, a rear portion, and at least one tray location for receiving the food tray; and blowing heated gas via a blower through an upper plenum and a plurality of apertures disposed in a jet plate, wherein the jet plate is disposed between the heating chamber and the upper plenum and wherein the gas exits the upper plenum through the apertures into the heating chamber directed substantially toward the food tray.

The method according to the moisture mode, further comprises placing a food tray cover above the food tray, thereby retaining moisture in the food tray. The food tray cover is preferably disposed between an upper portion of the food tray and the jet plate, whereby the heated gas passes through the jet plate and contacts an upper surface of the food tray cover. The preferably the food tray cover comprises a flat plate in contact with the food tray and a perpendicularly upwardly facing front edge portion. The perpendicularly upwardly facing front edge portion comprises a plurality of venting apertures, whereby the heated gas which contacts the food tray cover exits the heating chamber. The food tray cover further comprises a perpendicularly outward facing lip portion, wherein the upwardly facing front edge portion is disposed between the flat plate and the outwardly facing lip portion.

The method according to the crispy mode, involves contacting, directly or indirectly, the food disposed within the food tray with the heated gas, thereby removing at least a portion of moisture from a surface of the food so as to maintain a crispy exterior of the food.

Further objects, features and advantages of the present disclosure will be understood by reference to the following drawings and detailed description.

DETAILED DESCRIPTION OF THE PREFERRED EMBODIMENT

Figure 1:
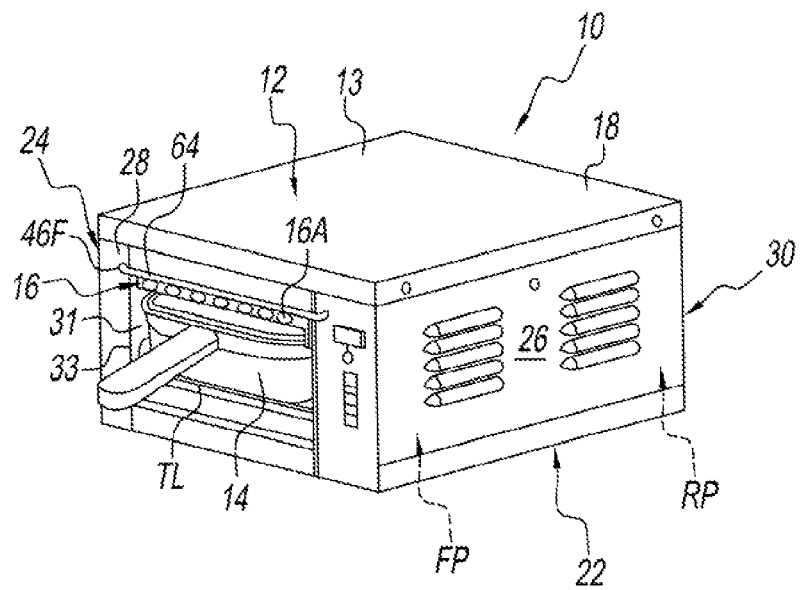
FIG. 1 is a front right side perspective view of a first embodiment of the food holding cabinet according to the present disclosure with a single tray.
Figure 1A:
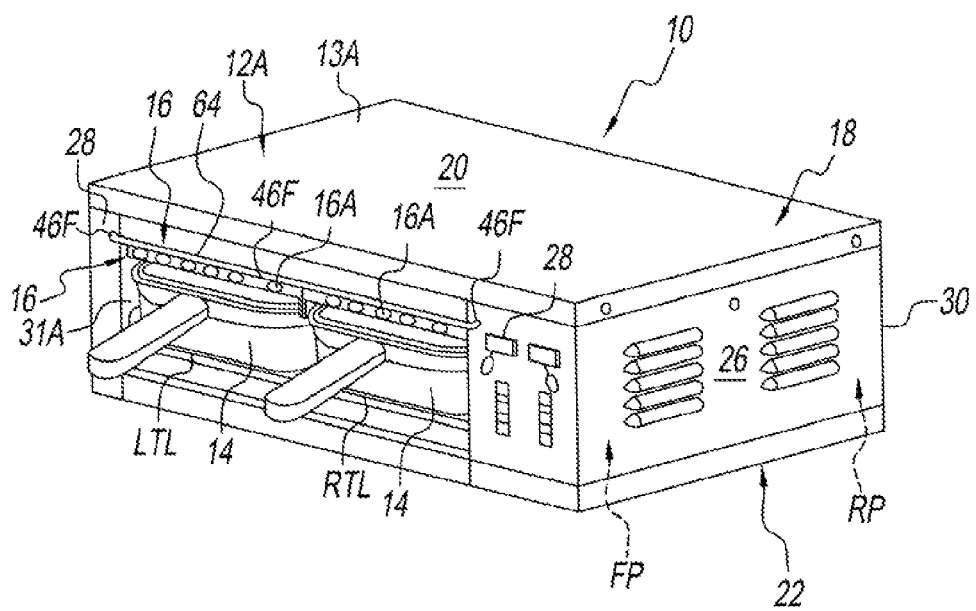
FIG. 1A is a front right side perspective view of yet another embodiment of the food holding cabinet according to the present disclosure with two trays.
Figure 1B:
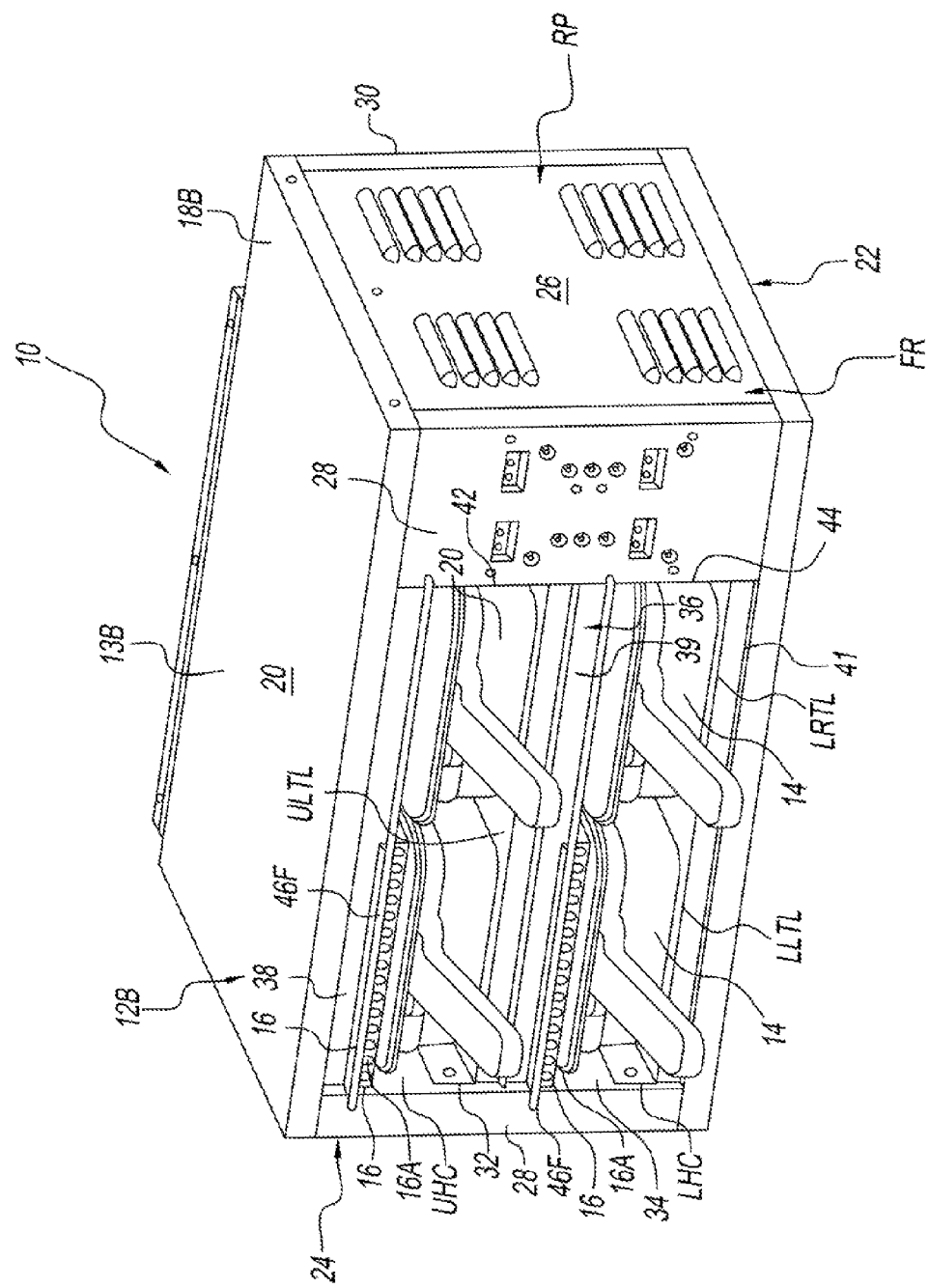
FIG. 1B is a front right side perspective view of yet another embodiment of the food holding cabinet according to the present disclosure with four trays.

Referring to FIGS. 1, 1A and 1B, there is shown a food holding cabinet assembly, generally designated 10, comprised of a food holding cabinet 12, one or more food holding trays 14 and one or more tray covers 16. Wherein the front edge of tray cover 16 include vent holes 16a to allow heated air to escape therefrom. Each food holding cabinet 12 (FIG. 1), 12a (FIG. 1A) and 12b (FIG. 1B) is comprised of a housing 18 having top and bottom walls 20, 22, side walls 24 and 26, and front and rear walls 28, 30. Housing 18 defines a heating chamber 31 and a heating chamber opening 33 for access to heating chamber 31, the heating chamber being for holding a covered food tray therein. Heating chamber 31 includes a front portion FP, a rear portion RP and at least one tray location TL for receiving a food tray 14. Each of FIGS. 1, 1A and 1B shows an embodiment of the food holding cabinet of the disclosure. FIG. 1 showing a basic embodiment for holding a single food holding tray 14, FIG. 1A includes two food holding trays 14, and FIG. 1B is an embodiment with four food holding trays 14, wherein the top and bottom left side trays include tray covers 16 with vent holes 16a for moisture retention and the top and bottom rights side trays do not include any tray covers to allow for crisping of the food product held therein.

In accordance with the disclosure, and preferably including all embodiments, food holding cabinet 12 is also comprised of a pair of rigid support structures 46 mounted to housing 13 for supporting and suspending a tray cover 16 in heating chamber 31 in a position or bin above the at least one tray location TL. Optionally, tray cover 16 can be omitted in the instance where food holding cabinet 12 is to be used for crisping of the food product rather than moisture retention. The pair of support structures 46 includes a front support structure 46F (shown) positioned adjacent to and extending across the front of heating chamber opening 33, and a rear support structure 46R (not shown) to positioned adjacent to and that extends across and is mounted, preferably fixed, to the rear portion RP of housing 13 or of heating chamber 31. Preferably, each of the support structures is an elongated rigid member, for example, a rod or a bar, desirably made of metal or plastic. Preferably, the rigid support structure(s) is or are releasable to facilitate removal of one or more suspended covers 16 from the rigid support(s). As will be explained and shown further, when a food tray 14 is inserted into the food tray location TL and under an optionally suspended tray cover 16, food tray 14 will engage a bottom portion of tray cover 16 and lift it upwardly off of the pair of support structures 46 such that the tray cover 16 is supported by food tray 14, and such that, as the underlying food tray 14 is removed from heating chamber 31, the front support structure 46f engages and prevents tray cover 16 from being removed from heating chamber 31 along with the food tray 14, and the pair of support structures 46 resume support and suspension of tray cover 16. In all embodiments of the disclosure, preferably, the pair of support members 46 are mounted to housing 13 at positions that will suspend a tray cover 16 thereon at a height that is slightly less than the height of the food tray 14 that is to be seated in the tray location. Optionally, one or both food trays 14 can have a tray cover 16, or neither requires a tray cover 16 if the products therein are only to be crisping versus moisture retention which would then require the use of the tray cover 16.

FIG. 1A shows a second preferred embodiment of the disclosure. More particularly, FIG. 1A shows a food holding cabinet 12a whose housing 13a defines a heating chamber 31a for holding a plurality of, here, two, covered food trays 14 at a plurality of food tray locations, a left bin or tray location LTL and a right bin or tray location RTL, the tray locations being side-by-side to one another and each for receiving a food tray 14. The pair of support structures 46 (front one shown) are, and are positioned and function as described in connection with the pair of support structures 46 shown in food holding cabinet 13 of FIG. 1. Tray cover 16 is optional depending upon the use thereof, as discussed above.

FIG. 1B shows a third embodiment of the disclosure. FIG. 1B shows a food holding cabinet 12b whose housing 13b defines a heating chamber 31b for holding a plurality of, here, four, food trays 14 at or in a plurality of four bins or food tray locations, wherein the top and bottom left side trays include tray covers 16 with vent holes 16a for moisture retention and the top and bottom right side trays do not include any tray covers to allow for crisping of the food product held therein. However, some, all or none of the food holding trays 14 require a tray cover 16 depending upon the needs of the restaurant. Heating chamber 31b includes two parts or compartments, an upper heating chamber or compartment (UC or UHC) and a lower heating chamber or compartment (LC or LHC), one being above the other and separated by a floor F, upper compartment (UC) including an upper left tray location (ULTF) and an upper right tray location (URTL), and lower compartment (LC) including a lower left tray location (LLTL) and an lower right tray location (LRTL), side-by-side to one another, each of the four tray locations being for receiving a respective food tray 14. In the embodiment of FIG. 1B, there are two pairs of support structures 46, a first upper pair of support structures 46 mounted to housing 18b to be operative to suspend a food tray cover 16 above each respective upper left tray location (ULTL) and upper right food tray location (URTL), and a second lower pair of support structures 46 mounted to the housing to be operative to suspend a food tray cover above each respective lower left and lower right food tray locations, (LLTL) and (LRTL), respectively. Each pair of support structures 46 (front one shown) is positioned and functions, as described in connection with the pair of support structures 46 shown in food holding cabinet 13 of FIGS. 1 and 1A. Thus, with respect to food holding cabinet 12b of FIG. 1B, each pair 46 of the two pairs of upper and lower support structures includes a front support structure 46F positioned adjacent to the front portion (FP) of the respective upper and lower compartments, and a rear support structure 46R positioned adjacent to the rear portion (RP) of the respective upper and lower heating compartments UHC, LHC, here respectively designated (32) and (34), each of the respective upper and lower front support structures extending across and in front of the heating chamber opening 42, 44 to the respective upper and lower compartments.

As shown in FIG. 1B, holding cabinet 12 can be comprised of one or more heating chambers, here shown as upper and lower heating chambers or sections 32, 34 that are vertically separated by an intermediate shelf 36. For example, upper heating chamber 32 has an upper heated air chamber 38 disposed along the ceiling of that chamber, and a lower heated air chamber 39 disposed along the top of shelf 36. Each heating chamber part or compartment includes two tray locations, a left tray location (LTL) and a right tray location (RTL). Upper heating chamber 32 portion has a front opening 42 and lower heating chamber 34 has a front opening 44.

Figure 2:
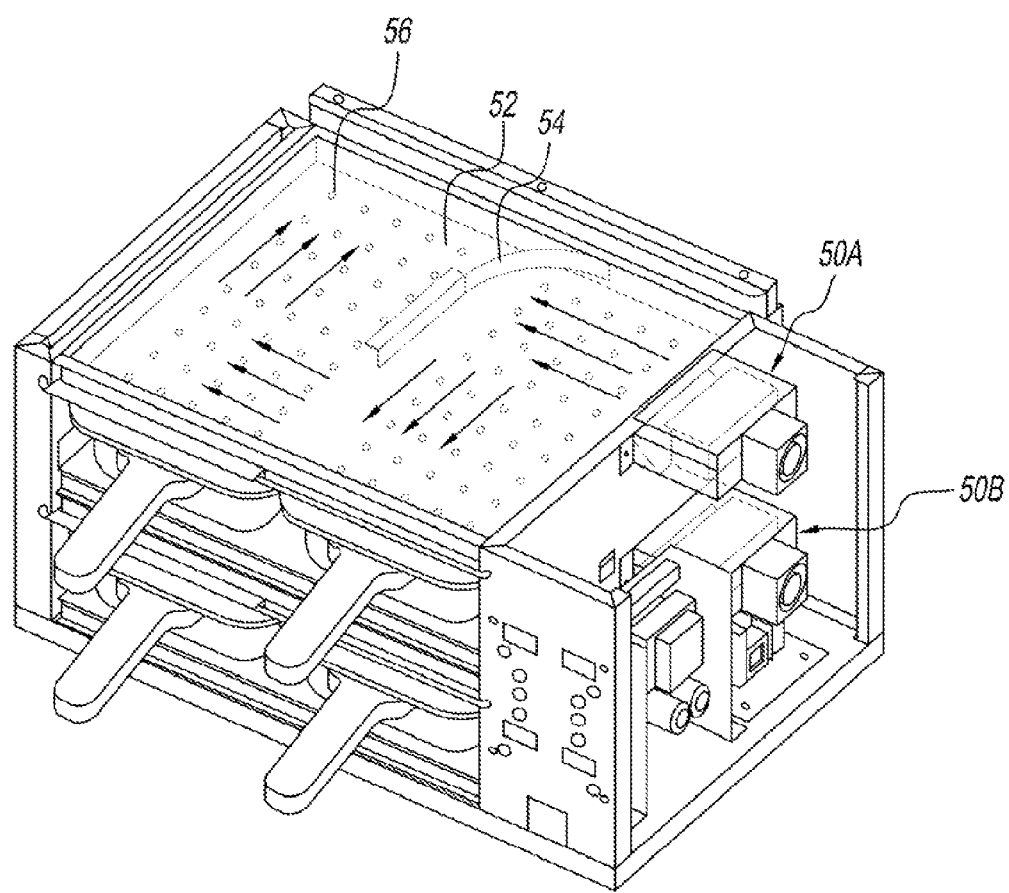
FIG. 2 is a view of FIG. 1B with the top portion and the side wall removed so as to expose heated air/gas blower units, upper jet plate, and air baffle.

FIG. 2 is a view of FIG. 1B with top portion 20 and side wall 26 removed so as to expose heated air blower units 50a and b, upper jet plate 52 and air baffle 54. Heated air exits units 50a and b into their respective heated air chambers 38 and 30 such that heated air is substantially evenly distributed over the top of upper jet plate 52 (lower jet plate not shown) to allow for balanced air flow out of apertures 56 toward food trays 14 and/or tray covers 16. When it is desirable to hold the food product in food tray 14 in a moisture condition, then a tray cover 16 will be deployed such that the air from heated air chamber 38 exits apertures 56 and contact tray cover 16 and then exits via vent holes 16a. However, if it is desirable to crisp the food product contained in food tray 14, then no tray cover will be employed and the air from heated air chamber 38 will exit apertures 56 and contact, directly or indirectly, the food product.

Figure 3:
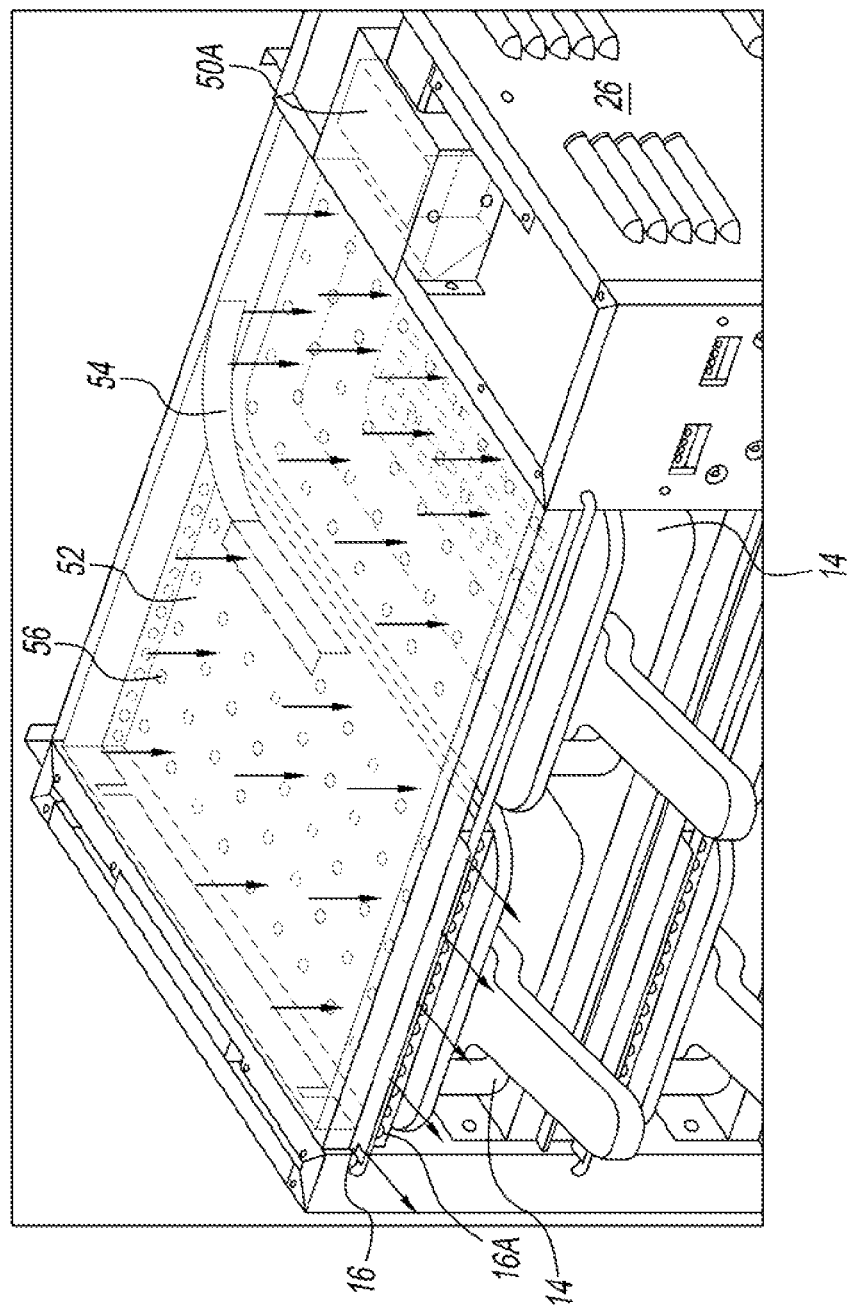
FIG. 3 is a top front right side perspective view of FIG. 2 exposing the left tray with a tray cover in place which is set up for moisture holding; and the right tray has no cover, thereby allowing heated air flow to impinge upon and maintain a crispy food surface exterior.

FIG. 3 is a view of FIG. 2 exposing the left tray with a tray cover in place which is set up for moisture holding (i.e. the heated air flow reflects off the tray cover 16 and exits through vent holes 16b in the front flange of cover 16); and the right tray has no cover, thereby allowing heated air flow to impinge upon and maintain a crispy food surface exterior.

Figure 2A:
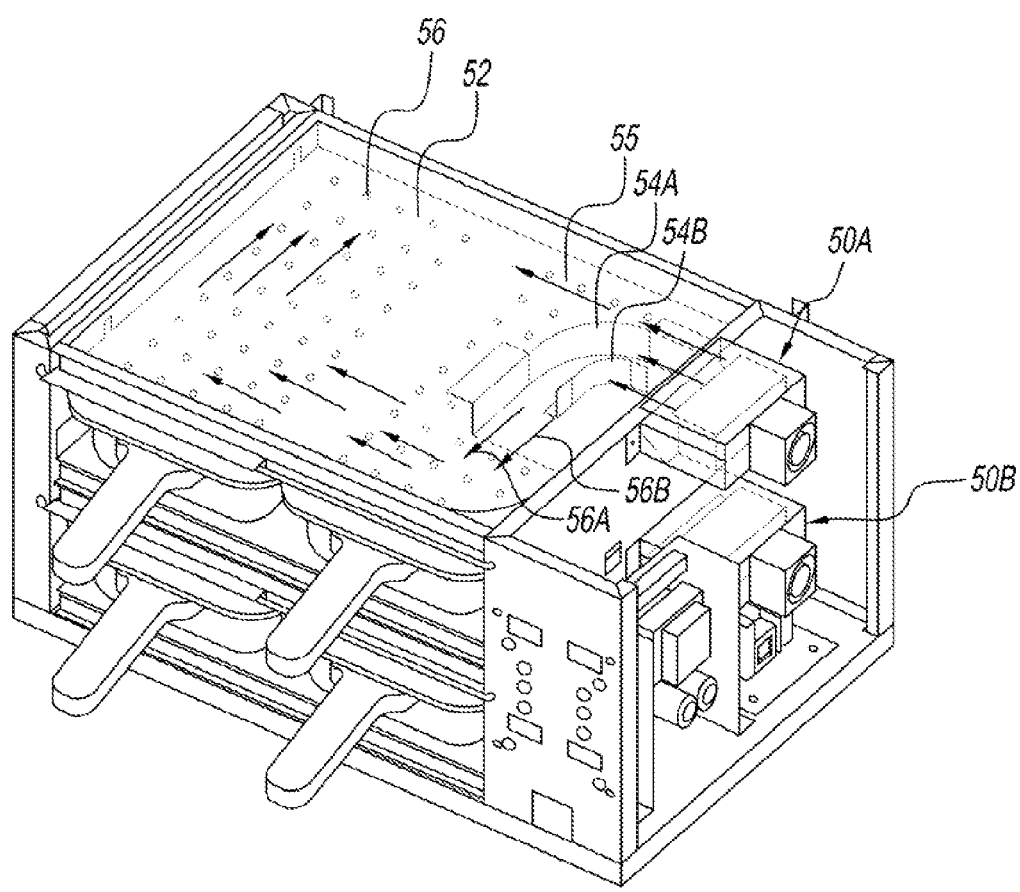
FIG. 2A is an alternative embodiment wherein air baffle directs a portion of the heated air/gas to the front, while the remainder of the air/gas is directed across the jet plate.

FIG. 2A is an alternative embodiment wherein air baffles 54a and 54b directs a portion of the heated air/gas to the front of the holding cabinet as shown by arrows 56a and 56b, while the remainder of the air/gas is directed across jet plate 52 as shown by arrow 55. This unique baffle configuration results in a uniformly balanced airflow and air temperature in the food product trays.

Figure 4:
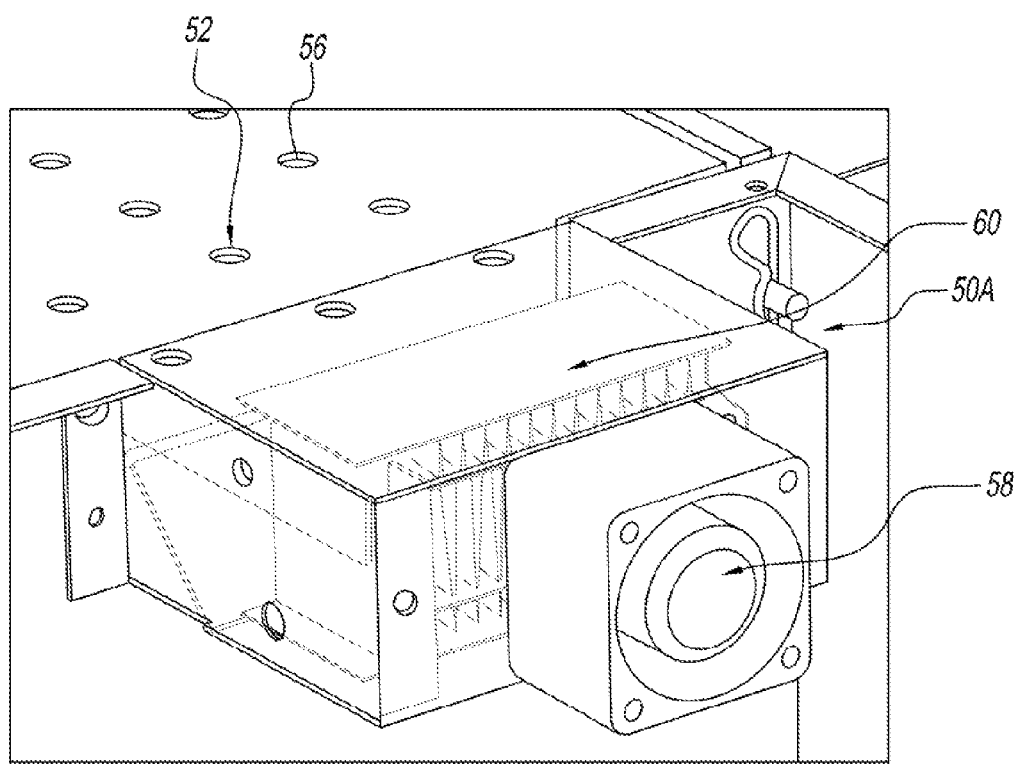
FIG. 4 is a perspective view of a heated air blower unit comprising a micro blower and heating element.

FIG. 4 is a view of heated air blower unit 50a comprising a micro blower 58 and heating element 60, wherein heating element 60 is disposed between blower 58 and jet plate 52.

Figure 5:
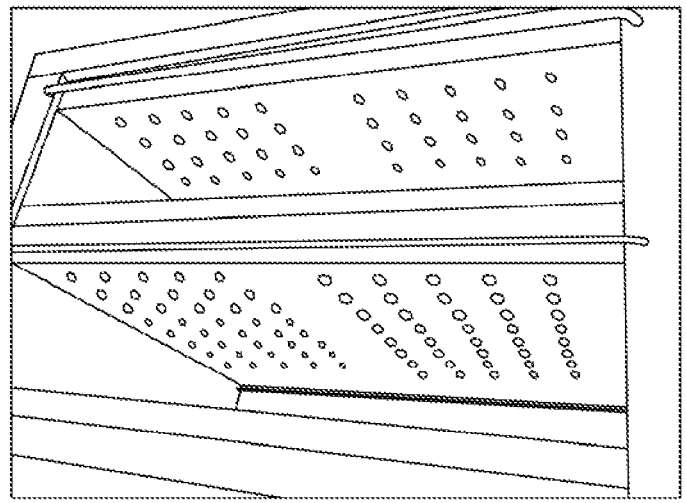
FIG. 5 is a bottom front view of jet plates in the heating chambers according to FIG. 1B.

FIG. 5 is a bottom front view of jet plates in the heating chambers according to FIG. 1B.

Figure 6:
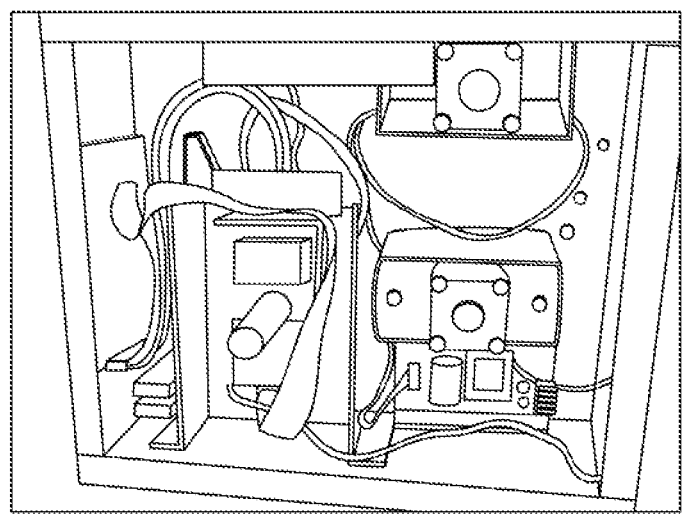
FIG. 6 is a right side planar view of the controller and first and second heated air blower units according to FIG. 1B.

FIG. 6 is a right side planar view of the controller and first and second heated air blower units according to FIG. 1B.

Figure 7A:
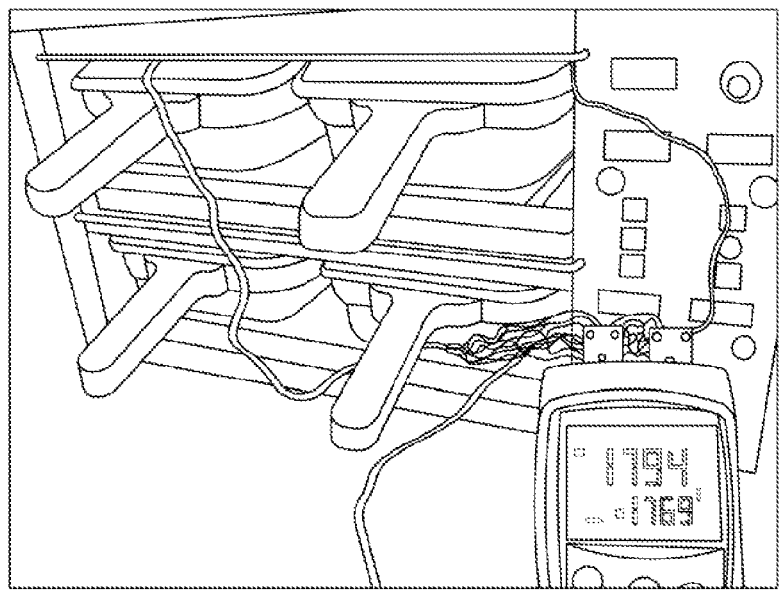
FIGS. 7A-D are a series of photographs showing the present invention and especially the perforated metal insert to allow airflow about the food product in the food holding tray.
Figure 7B:
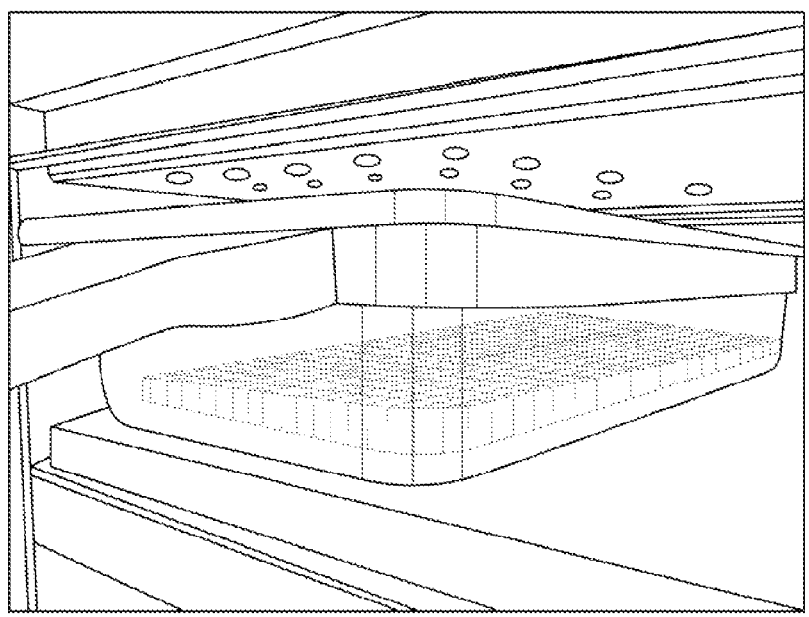
Figure 7C:
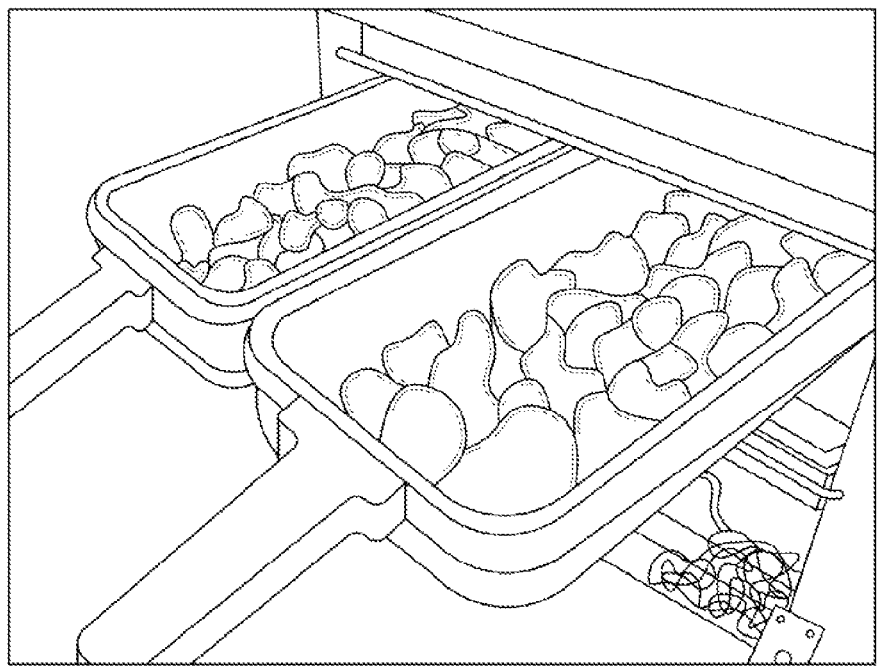
Figure 7D:
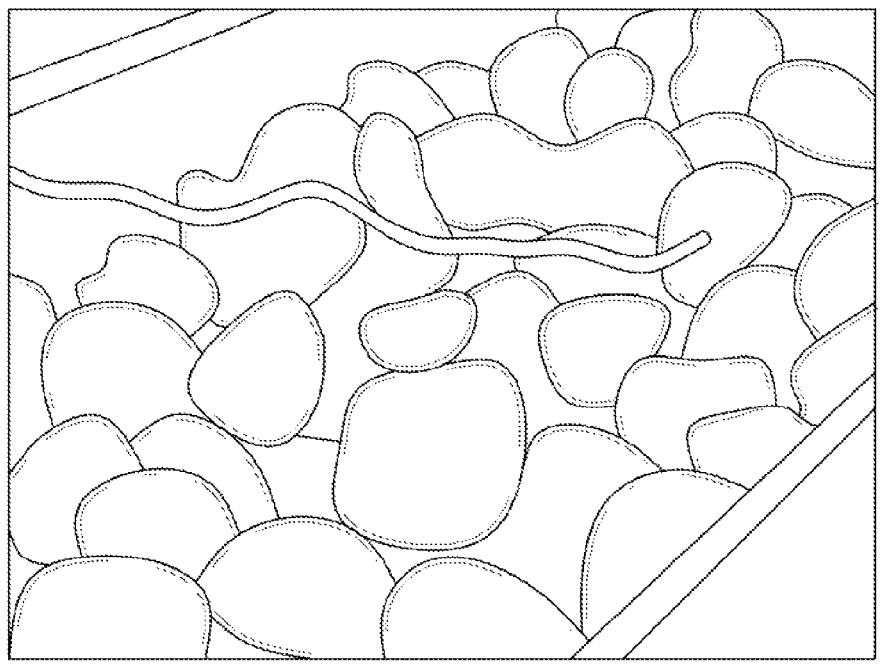

The holding cabinet according to the present disclosure adds heated airflow down from the upper platen to flow through the food in the trays. Moisture is removed from the food surface to maintain a crispy exterior when the tray cover is removed, while keeping the internal hot and moist. In the crispy mode, i.e. when no tray cover is employed, air flow passes over the food items in the food holding tray and exits through holes below added in the tray sidewalls (FIG. 7B). See photographs in FIGS. 7A-D. Alternatively, one may use trays in which the airflow passes over the food product and thereafter reflects off the bottom surface and exits around the perimeter of the tray.

Figure 8A:
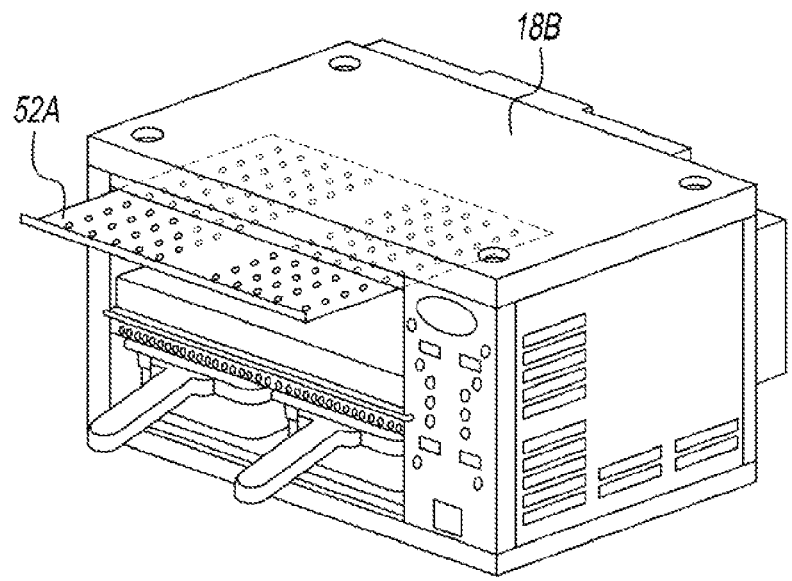
FIG. 8A is a schematic top, front, right side perspective view of the food holding cabinet according to the present disclosure with a removable jet plate partially removed therefrom.
Figure 8B:
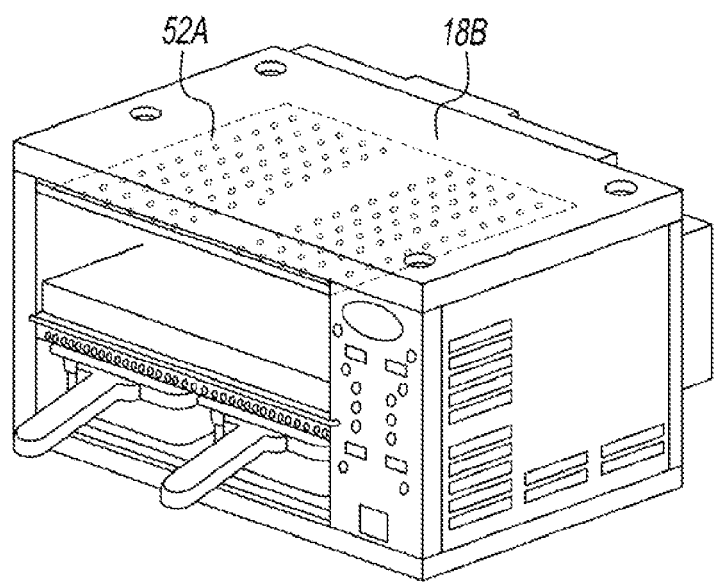
FIG. 8B is a schematic representation from a top, front, right side perspective view of the food holding cabinet according to the present disclosure with a removable jet plate in the fully installed position within the cabinet.

FIG. 8A depicts a removable jet plate 52a in a partially removed position with respect to housing 18b. FIG. 8B depicts removable jet plate 52a in a fully engage position during operation of the holding cabinet.

Figure 9A:
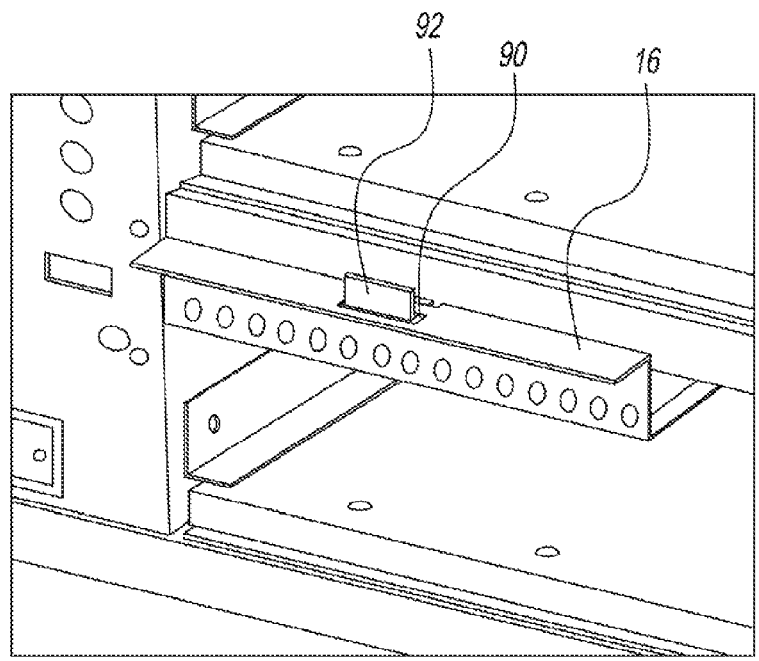
FIGS. 9A-C are schematic representation from a top, front, right side perspective view of another embodiment of a tray holding method according to the present disclosure.
Figure 9B:
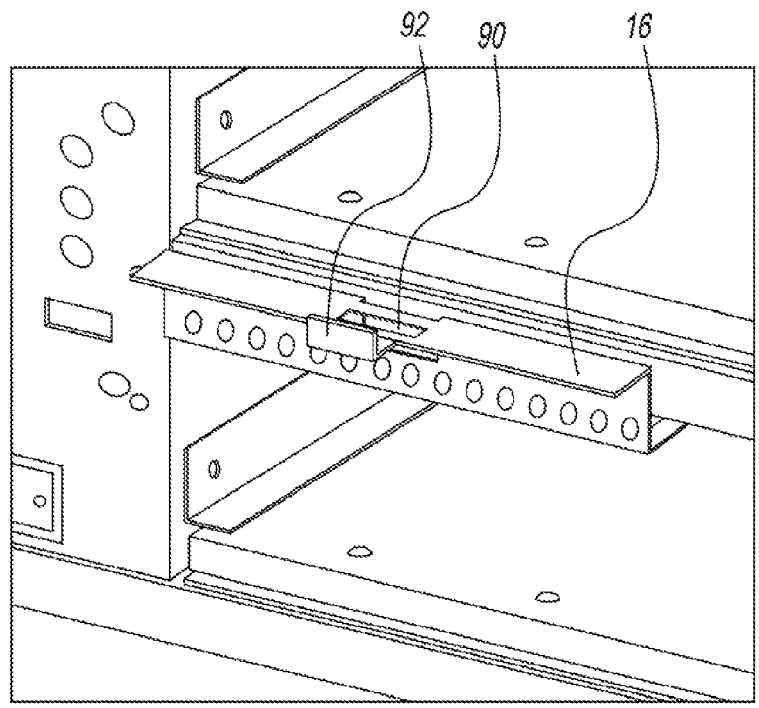
Figure 9C:
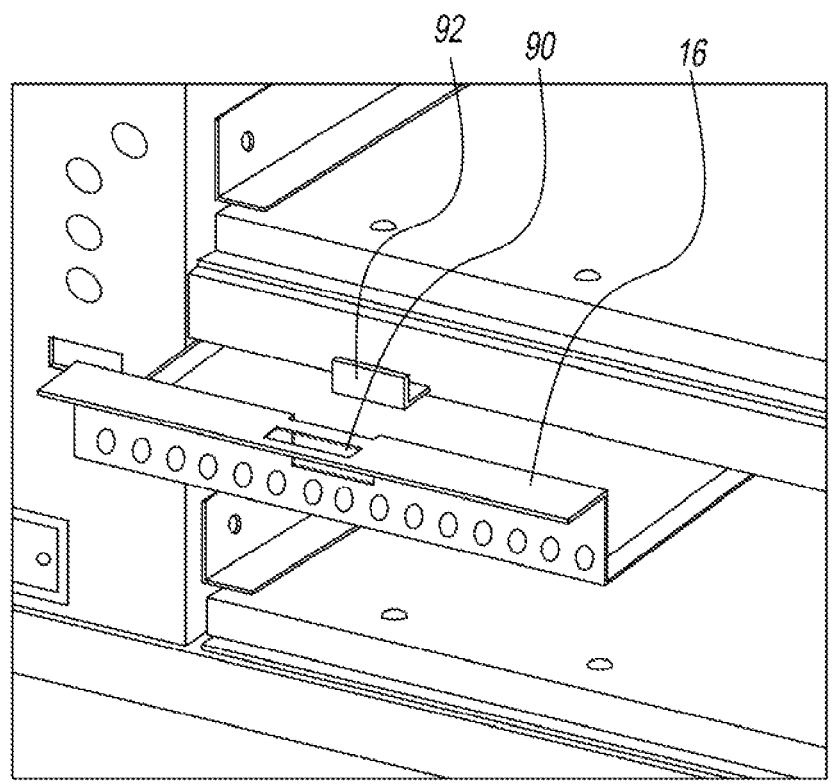

FIGS. 9A-C depict another embodiment according to the present disclosure, wherein FIG. 9A shows tray cover 16 is a hold position, wherein slot 90 receives right angles support bracket 92. FIG. 9B shows how tray cover 16 is lifted upward, such that support bracket 92 is disengaged from slot 90, wherein tray cover 16 is free to move downward toward the tray, not shown. FIG. 9C shows tray cover moved outward toward the user.

Figure 10:
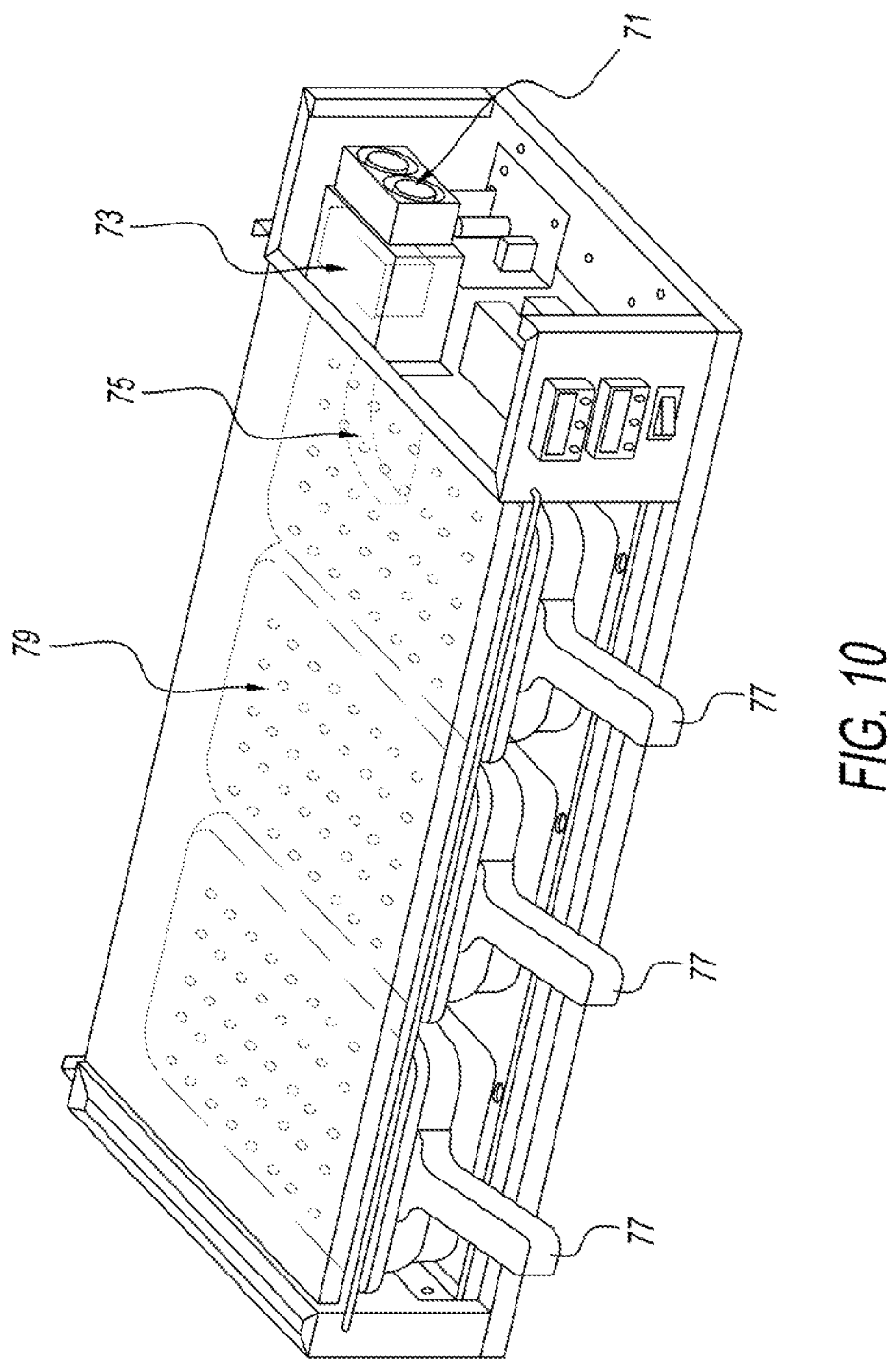
FIG. 10 is an alternative embodiment of the present disclosure, wherein a pair of microblowers and thermal system direct heated air/gas across three product trays.

FIG. 10 is an alternative embodiment of the present disclosure, wherein a pair of microblowers 71 direct air or gas across heating element 73 and into baffle 75 to direct the air/gas across three (3) food trays 77 via a single jet plate 79.

Figure 11:
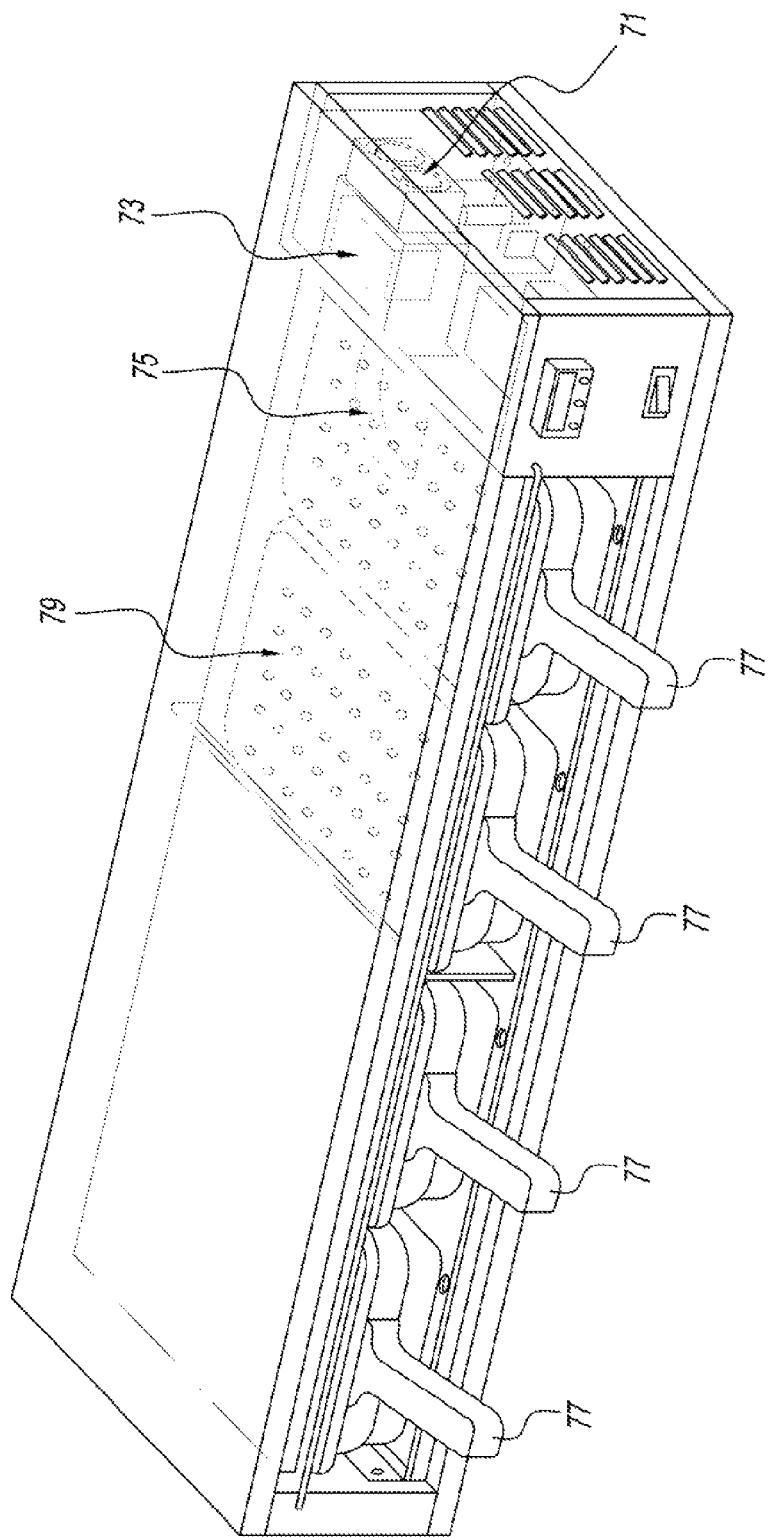
FIG. 11 is yet another embodiment, wherein a pair of microblowers and thermal system direct heated air/gas across four product trays.

FIG. 11 is yet another embodiment similar to FIG. 10, but wherein there are four (4) food trays in series.

Figure 12A:
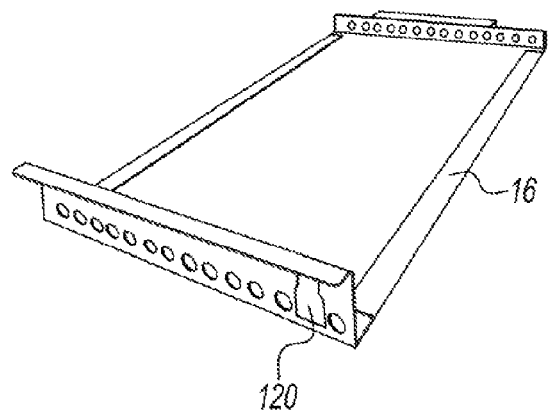
FIG. 12A is an alternative embodiment showing a top, front right side perspective view of a tray cover with yet another tray holding method according to the present disclosure.
Figure 12B:
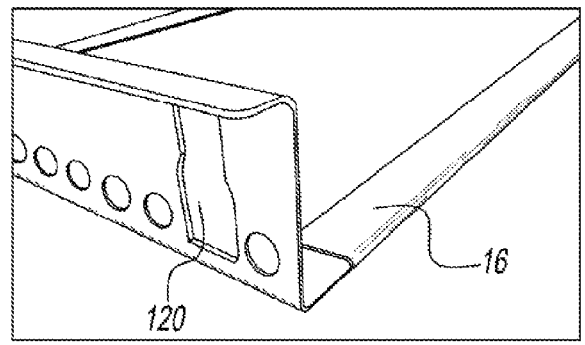
FIG. 12B is an expanded view of the locking slot in the front of the tray cover used to hold in place the tray.
Figure 12C:
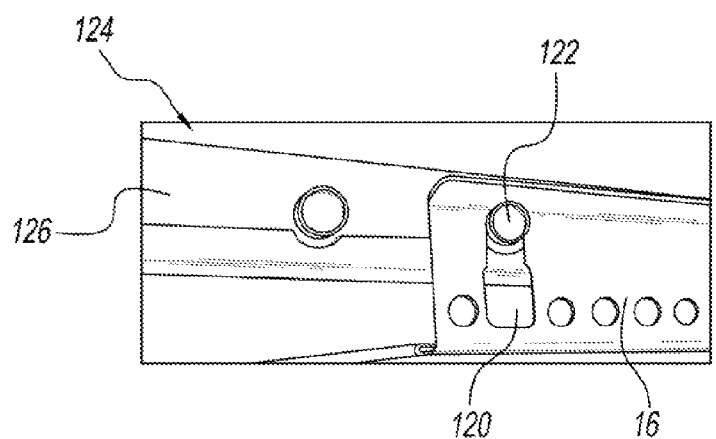
FIG. 12C is a front planar view of the tray cover secured to the front of the holding cabinet using the locking slot and bolt according to the present disclosure.

FIGS. 12A-C is an alternative embodiment showing a top, front right side perspective view of a tray cover 16 having yet another tray holding method, i.e. a locking slot 120 and bolt 122. FIG. 12C shows tray cover 16 secured to the front 124 of holding cabinet 126 using locking slot 120 and bolt 122.

Figure 13:
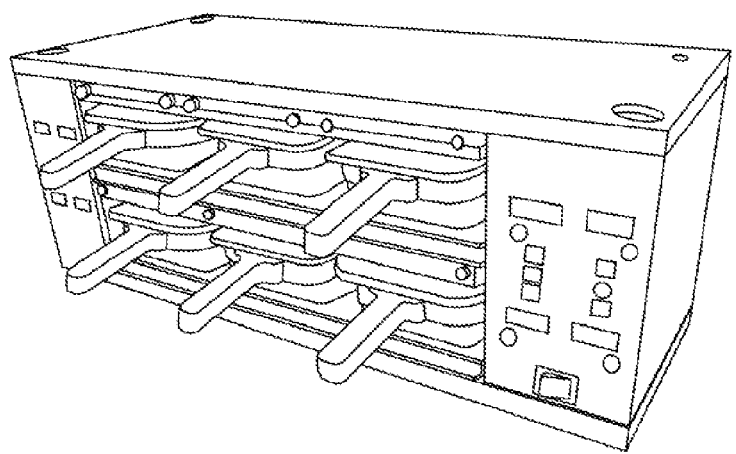
FIG. 13 is a front right side perspective view of yet another embodiment of the food holding cabinet according to the present disclosure with eight trays.
Figure 14:
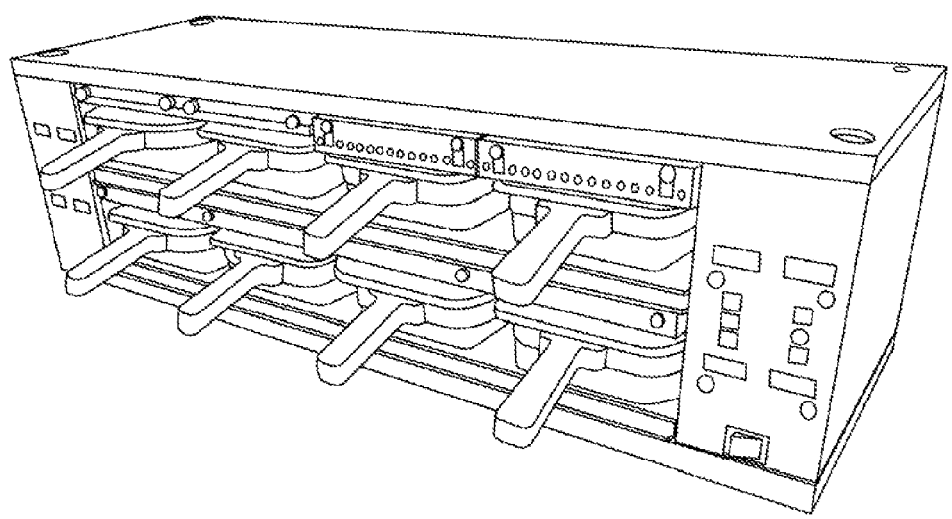
FIG. 14 is a front right side perspective view of yet another embodiment of the food holding cabinet according to the present disclosure with six trays.

FIG. 13 is a front right side perspective view of yet another embodiment of the food holding cabinet according to the present disclosure with eight trays; and FIG. 14 is a front right side perspective view of yet another embodiment of the food holding cabinet according to the present disclosure with six trays. However, this device can be designed to include any number and configuration of trays. In the embodiment of FIG. 13, the micro blower and heating element in left and right side control bays. Each blower system provides heated airflow to two trays via an upper air plenum which is divided down the center (not shown). FIG. 14 includes two control bays with four micro blowers.

While we have shown and described several embodiments in accordance with our disclosure, it is to be clearly understood that the same may be susceptible to numerous changes apparent to one skilled in the art. Therefore, we do not wish to be limited to the details shown and described but intend to show all changes and modifications that come within the scope of the appended claims.

What is claimed is:

1. A cabinet for holding cooked food products, comprising:
   a housing that defines a heating chamber therein, and comprises a heating chamber opening for access to the heating chamber, wherein said heating chamber comprises a top portion, a front portion, and a rear portion;
   a food tray comprising a cooked food product therein, wherein said heating chamber comprises a tray location for receiving said food tray;
   a jet plate including a plurality of apertures, wherein said jet plate is between said heating chamber and an upper plenum, wherein said upper plenum is above an upper surface of said jet plate;
   a blower in fluid communication with said upper plenum, so that said blower provides heated gas into said upper plenum, wherein said gas exits said upper plenum through said apertures into said heating chamber such that it is directed substantially toward said food tray and then directed out of said cabinet through said opening;
   an air baffle disposed on said upper surface of said jet plate in said upper plenum, wherein at least a portion of said heated gas from said blower is directed toward the front of said food holding cabinet; and
   a tray cover removably connected to said housing,
   wherein said food holding cabinet operates in at least one mode selected from the group consisting of a moisture mode and a crispy mode,
   wherein during said moisture mode, said food tray cover is disposed between an upper portion of said food tray and said jet plate to retain moisture in said food tray, whereby said heated gas passes through said jet plate and contacts an upper surface of said food tray cover, before being directed out of said cabinet through said opening,
   wherein during said crispy mode, said food tray cover is removed, and the heated gas passes over the cooked food item in said food tray, or reflects off a bottom surface of said food tray and exits around a periphery of said food tray and is directed out of said cabinet through said opening, and
   wherein no heated gas is directed back to said blower.

2. The food holding cabinet according to claim 1, wherein said food tray cover comprises a flat plate in contact with said food tray and a perpendicularly upwardly facing front edge portion.

3. The food holding cabinet according to claim 2, wherein said perpendicularly upwardly facing front edge portion comprises a plurality of venting apertures, whereby said heated gas, which contacts said food tray cover, exits said heating chamber opening via said venting apertures.

4. The food holding cabinet according to claim 2, further comprising a perpendicularly outward facing lip portion, wherein said upwardly facing front edge portion is disposed between said flat plate and said outwardly facing lip portion.

5. The food holding cabinet according to claim 1, wherein during said crispy mode said heated gas contacts said food item, directly or indirectly, disposed in said food tray and thereby removing at least a portion of moisture from a surface of said food item so as to maintain a crispy exterior of said food item.

6. The food holding cabinet according to claim 1, wherein said blower comprises a micro blower and heating element, wherein said micro blower is outside said heating chamber, and wherein said heating element is disposed between said micro blower and said jet plate.

7. The food holding cabinet according to claim 1, wherein said air baffle is at least two air baffles disposed on said upper surface of said jet plate in said upper plenum, wherein at least a portion of said heated gas from said blower is directed toward the front of said food holding cabinet.

8. The food holding cabinet according to claim 7, wherein said two air baffles are disposed in parallel relationship to one another.

9. The food holding cabinet according to claim 1, wherein said air baffle is spaced away from the rear wall of the upper plenum, thereby allowing a portion of said heated gas from said blower to be directed across said jet plate to the opposing side from said blower.

10. The food holding cabinet according to claim 1, wherein said heating chamber comprises at least two of said food trays therein.

11. The food holding cabinet according to claim 10, wherein said heating chamber comprises at least three of said food trays therein.

12. The food holding cabinet according to claim 10, wherein said air baffle is disposed between said first and second food trays.

13. The food holding cabinet according to claim 12, further comprising a food tray cover disposed above said first food tray, thereby retaining moisture in said first food tray and wherein said second food tray does not include a food tray cover.

14. The method according to claim 12, wherein said heating chamber comprises at least three of said food trays therein.

15. The food holding cabinet according to claim 1, further comprising a plurality of said heating chambers, wherein each said heating chamber comprises at least one food tray, and said blower.

16. The food holding cabinet according to claim 1, wherein said blower is a micro blower.

17. The food holding cabinet of claim 1, wherein said food tray is a plurality of food trays, said jet plate is a plurality of jet plates, and said blower is a plurality of blowers, and said chamber has an upper heating compartment and a lower heating compartment, so that at least one food tray is in said upper heating compartment and at least one food tray is in said lower heating compartment, and wherein each of said upper heating compartment and said lower heating compartment has one of said blowers and one of said jet plates associated therewith.

18. A method for holding cooked food in at least one food tray disposed in a heating chamber of a holding cabinet, said method comprising:
    placing said food tray with said cooked food into said heating chamber, wherein said heating chamber comprises a top portion, a front portion, a rear portion, an opening, a tray location for receiving said food tray via said opening, and a tray cover removably connected thereto;
    blowing heated gas via a blower through an upper plenum and a plurality of apertures disposed in a jet plate, wherein said jet plate is between said heating chamber and said upper plenum, and wherein said gas exits said upper plenum through said apertures into said heating chamber, is directed substantially toward said food tray and directed out of said cabinet;
    directing at least a portion of said heated gas from said blower toward the front of said holding cabinet via at least one air baffle disposed on an upper surface of said jet plate in said upper plenum; and
    operating said food holding cabinet in at least one mode selected from the group consisting of:
    a moisture mode in which said food tray cover is disposed between an upper portion of said food tray and said jet plate to retain moisture in said food tray, whereby the heated gas passes through said jet plate and contacts an upper surface of said food tray cover, before being directed out of said cabinet through said opening; and
    a crispy mode in which said tray cover is removed, and the heated gas passes over at least one cooked food item in the food tray or reflects off a bottom surface of said food tray and exits around a periphery of said food tray and directed out of said cabinet through said opening, wherein no heated gas is directed back to said blower.

19. The method according to claim 18, wherein said food tray cover comprises a flat plate in contact with said food tray and a perpendicularly upwardly facing front edge portion.

20. The method according to claim 19, wherein said perpendicularly upwardly facing front edge portion comprises a plurality of venting apertures, whereby said heated gas which contacts said food tray cover exits to ambient via said heating chamber opening.

21. The method according to claim 19, further comprises a perpendicularly outward facing lip portion, wherein said upwardly facing front edge portion is disposed between said flat plate and said outwardly facing lip portion.

22. The method according to claim 18, further comprising contacting, directly or indirectly, said cooked food disposed within said food tray with said heated gas, thereby removing at least a portion of moisture from a surface of said food so as to maintain a crispy exterior of said food.

23. The method according to claim 18, wherein said blowing of said heated gas is conducted by a blower.

24. The method according to claim 23, wherein said blower comprises a micro blower and heating element, wherein said micro blower is outside said heating chamber, and wherein said heating element is disposed between said micro blower and said jet plate.

25. The method according to claim 18, wherein said air baffle is at least two air baffles disposed on said upper surface of said jet plate in said upper plenum, wherein at least a portion of said heated gas from said blower is directed toward the front of said food holding cabinet.

26. The method according to claim 25, wherein said two air baffles are disposed in parallel relationship to one another.

27. The method according to claim 18, wherein said air baffle is spaced away from the rear wall of the upper plenum, thereby directing a portion of said heated gas from said blower across said jet plate to the opposing side from said blower.

28. The method according to claim 18, wherein said heating chamber comprises at least two of said food trays therein.

29. The method according to claim 28, wherein said air baffle is disposed between said first and second food trays.

30. The method according to claim 29, further comprising a food tray cover disposed above said first food tray, thereby retaining moisture in said first food tray and wherein said second food tray does not include a food tray cover.

31. The method according to claim 18, further comprising a plurality of said heating chambers, wherein each said heating chamber comprises at least one food tray, and said blower.

32. The method according to claim 18, wherein said blower is a micro blower.

33. The method of claim 18, wherein said food tray is a plurality of food trays, said jet plate is a plurality of jet plates, and said blower is a plurality of blowers, and said chamber has an upper heating compartment and a lower heating compartment, so that at least one food tray is in said upper heating compartment and at least one food tray is in said lower heating compartment, and wherein each of said upper heating compartment and said lower heating compartment has one of said blowers and one of said jet plates associated therewith.

* * * * *